United States Patent
Ando et al.

(10) Patent No.: US 9,109,934 B2
(45) Date of Patent: Aug. 18, 2015

(54) SOLUTION PROCESSING APPARATUS, SOLUTION PROCESSING METHOD, AND NON-TRANSITORY COMPUTER-READABLE RECORDING MEDIUM

(71) Applicant: TOKYO ELECTRON LIMITED, Tokyo (JP)

(72) Inventors: Ryoji Ando, Koshi (JP); Takami Satoh, Koshi (JP)

(73) Assignee: TOKYO ELECTRON LIMITED, Tokyo (JP)

( * ) Notice: Subject to any disclaimer, the term of this patent is extended or adjusted under 35 U.S.C. 154(b) by 96 days.

(21) Appl. No.: 13/864,654

(22) Filed: Apr. 17, 2013

(65) Prior Publication Data

US 2013/0283929 A1  Oct. 31, 2013

(30) Foreign Application Priority Data

Apr. 26, 2012  (JP) .................. 2012-101471

(51) Int. Cl.
  *G01F 1/66* (2006.01)
  *B05C 11/10* (2006.01)

(52) U.S. Cl.
  CPC ............... *G01F 1/66* (2013.01); *B05C 11/1013* (2013.01)

(58) Field of Classification Search
  CPC .................................. G01F 1/66; G01F 15/08
  USPC .............. 73/861.27, 861.28; 222/72; 118/663
  See application file for complete search history.

(56) References Cited

U.S. PATENT DOCUMENTS

| | | | | |
|---|---|---|---|---|
| 4,607,520 A | * | 8/1986 | Dam | 73/19.03 |
| 4,696,191 A | * | 9/1987 | Claytor et al. | 73/600 |
| 5,779,796 A | * | 7/1998 | Tomoeda et al. | 118/319 |
| 6,790,283 B2 | * | 9/2004 | Hayashi et al. | 118/665 |
| 8,322,571 B2 | * | 12/2012 | Hovinen et al. | 222/65 |
| 2009/0019945 A1 | * | 1/2009 | Matsushita | 73/861.28 |
| 2012/0036942 A1 | * | 2/2012 | Hasunuma | 73/861.28 |

FOREIGN PATENT DOCUMENTS

| | | |
|---|---|---|
| JP | 2003-197516 A | 7/2003 |
| JP | 2004-226391 A | 8/2004 |

* cited by examiner

*Primary Examiner* — Harshad R Patel
(74) *Attorney, Agent, or Firm* — Nath, Goldberg & Meyer; Jerald L. Meyer; Tiffany A. Johnson (57) ABSTRACT

According to an embodiment of the present disclosure, an apparatus is configured to perform a solution process by supplying a processing solution from a processing solution supply source to the substrate held on a substrate holder via a flow path member and a nozzle at a flow rate equal to or less than 1 mL/sec. The apparatus includes a solution transfer unit configured to transfer the processing solution to the nozzle, and mounted to the flow path member, and an ultrasonic flowmeter mounted to the flow path member at a downstream side from the solution transfer unit. In this embodiment, a lower limit of a flow rate range which is measured by the ultrasonic flowmeter is equal to or less than 1 mL/sec.

15 Claims, 8 Drawing Sheets

SOLUTION PROCESSING APPARATUS, SOLUTION PROCESSING METHOD, AND NON-TRANSITORY COMPUTER-READABLE RECORDING MEDIUM

CROSS-REFERENCE TO RELATED APPLICATION

This application claims the benefit of Japanese Patent Application No. 2012-101471, filed on Apr. 26, 2012, in the Japan Patent Office, the disclosure of which is incorporated herein in its entirety by reference.

TECHNICAL FIELD

The present disclosure relates to a solution processing apparatus and a method thereof, and a non-transitory computer-readable recording medium, which process a processing solution supplied to a substrate such as a semiconductor wafer.

BACKGROUND

When performing a photolithography in a manufacturing process of a semiconductor device, a resist coating process for forming a resist film on a surface of a semiconductor wafer (hereinafter, referred to as a "wafer") is performed. A spin coating method is generally applied to the resist coating process. A liquid chemical for a resist film (hereinafter, referred to as a "resist" simply) is expensive, and requires a method for lowering the consumption of the resist as much as possible, while maintaining a discharge amount for ensuring a high in-plane uniformity with respect to a thickness of the resist film. That is, in order to perform the above process, it is required to detect a flow rate with a high accuracy at a region having a small flow rate. However, there is no flowmeter suitable thereto. For this reason, for example, a method which periodically adjusts a pressure of a pump using an electric balance has been used. However, such periodical adjustment is inconvenient. In addition, a bubble may occur due to gas dissolved in the resist. As a line width of a pattern becomes finer and finer, it is necessary to detect and handle a fine bubble, although the fine bubble did not cause any problem in the past when the line width of the pattern need not be finer.

In the related art, there is a known method in which a pair of ultrasonic receiver-transmitters is mounted on a peripheral portion of a pipe through which a fluid flows in order to measure a flow rate of the fluid. There is also known method in which a discharge amount is controlled by adjusting a valve in front of a discharge hole to be opened or closed based on measurement results of an ultrasonic flowmeter. Unfortunately, these methods detect a minute flow rate of 1 mL/sec or less.

SUMMARY

Some embodiments of the present disclosure provide to a solution processing apparatus and a method thereof, and a non-transitory computer-readable recording medium, which are capable of measuring a flow rate of a processing solution with a high accuracy in processing the substrate using the processing solution.

According to one embodiment of the present disclosure, provided is an apparatus configured to perform a solution process by supplying a processing solution from a processing solution supply source to the substrate held on a substrate holder via a flow path member and a nozzle. The apparatus includes a solution transfer unit configured to transfer the processing solution to the nozzle and mounted to the flow path member and an ultrasonic flowmeter mounted to the flow path member at a downstream side from the solution transfer unit. The lower limit of a flow rate range which can be measured by the ultrasonic flowmeter is equal to or less than 1 mL/sec. The ultrasonic flowmeter includes a first piezoelectric element and a second piezoelectric element which are spaced apart from each other in a flow direction of the processing solution and are formed in a circular shape to surround a periphery of the flow path member and a measuring unit configured to measure the flow rate of the processing solution, based on a variation of ultrasonic propagation times between when ultrasonic is propagated from the first piezoelectric element to the second piezoelectric element and when the ultrasonic is propagated from the second piezoelectric element to the first piezoelectric element.

According to another embodiment of the present disclosure, provided is a method for performing a solution process by supplying a processing solution from a processing solution supply source to the substrate held on a substrate holder via a flow path member and a nozzle. The method includes measuring a flow rate of the processing solution by an ultrasonic flowmeter mounted to the flow path member. The lower limit of the flow rate which can be measured by the ultrasonic flowmeter is equal to or less than 1 mL/sec. The flow rate of the processing solution is measured using a first piezoelectric element and a second piezoelectric element which are spaced apart from each other in a flow direction of the processing solution and are formed in a circular shape to surround a periphery of the flow path member, based on a variation of ultrasonic propagation times between when ultrasonic is propagated from the first piezoelectric element to the second piezoelectric element and when the ultrasonic is propagated from the second piezoelectric element to the first piezoelectric element.

According to another embodiment of the present disclosure, provided is a non-transitory computer-readable recording medium storing a program that causes a computer to execute the aforementioned method.

BRIEF DESCRIPTION OF THE DRAWINGS

The accompanying drawings, which are incorporated in and constitute a part of the specification, illustrate embodiments of the present disclosure, and together with the general description given above and the detailed description of the embodiments given below, serve to explain the principles of the present disclosure.

DETAILED DESCRIPTION

Reference will now be made in detail to various embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, systems, and components have not been described in detail so as not to unnecessarily obscure aspects of the various embodiments.

Hereinafter, a description will be made as one embodiment in which a solution processing apparatus of the present disclosure is applied to a resist coating apparatus.

First, the entire configuration of the resist coating apparatus will be briefly described with reference to FIG. 1. The resist coating apparatus includes: a cup module 60 equipped with a spin chuck 61 that is a substrate holding part for horizontally holding a wafer W, as a substrate; a nozzle 50 configured to supply a resist that is a processing solution onto the central portion of the wafer W held by the spin chuck 61; and a resist supply unit 10 configured to supply the resist to the nozzle 50. As shown in FIG. 2, the nozzle 50 is mounted in a nozzle moving unit 81 and movable between above the cup module 60 and a standby bath 89 that is a solution receiving unit configured to receive the resist caused by a dummy dispensing.

The cup module 60 is formed to surround the spin chuck 61 and includes a cup body 63 configured to receive the resist dispersed from the wafer W. A lower portion of the 63 is connected to a suction/exhaust channel (not shown) through which a drain can be discharged. The cup body 63 is constituted by combining an inner cup and an outer cup to prevent mist from being soared, which are omitted herein.

Figure 1:
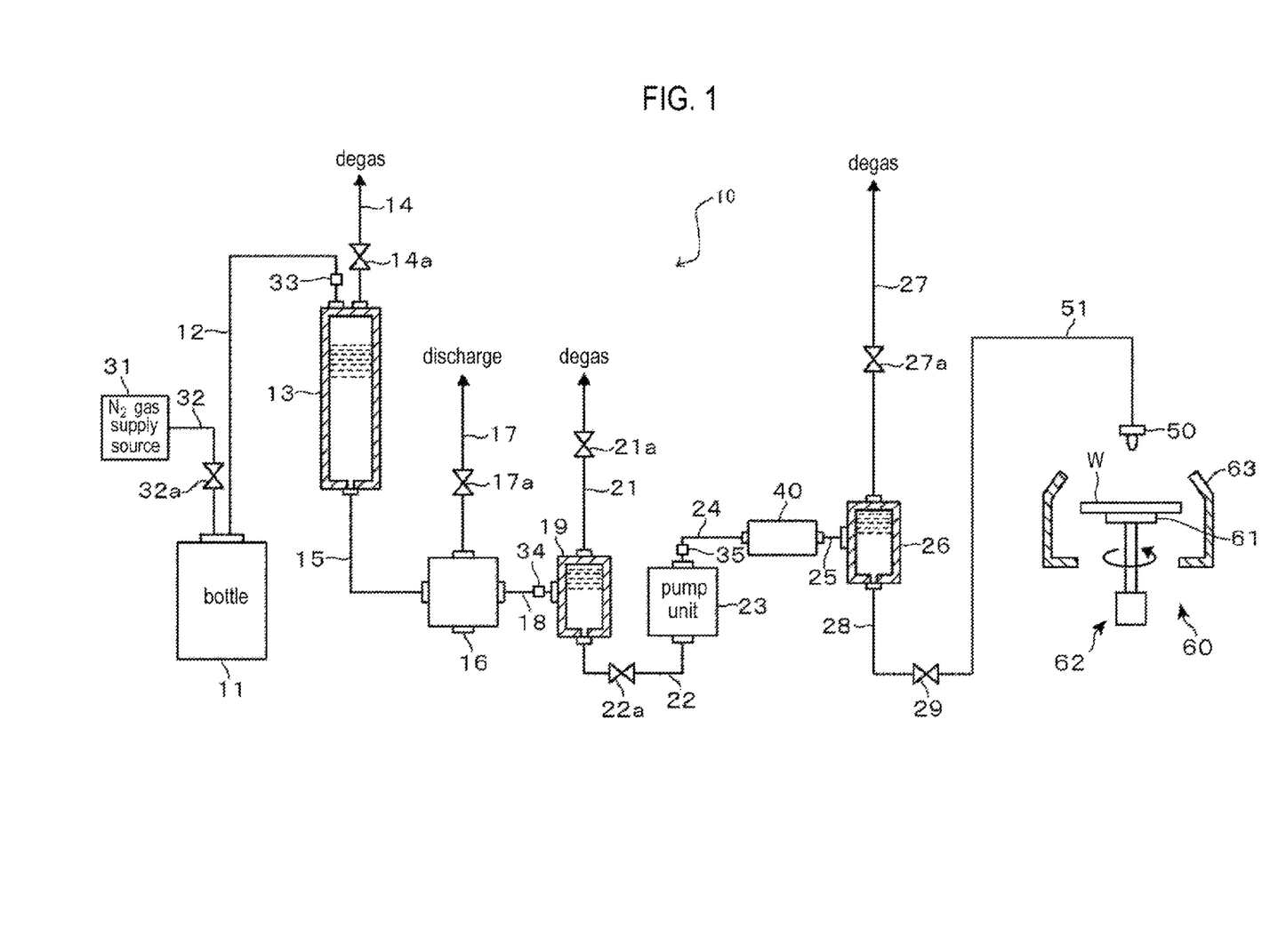
FIG. 1 is a view showing one embodiment of a resist supply unit which constitutes a resist coating apparatus according to the present disclosure.
Figure 2:
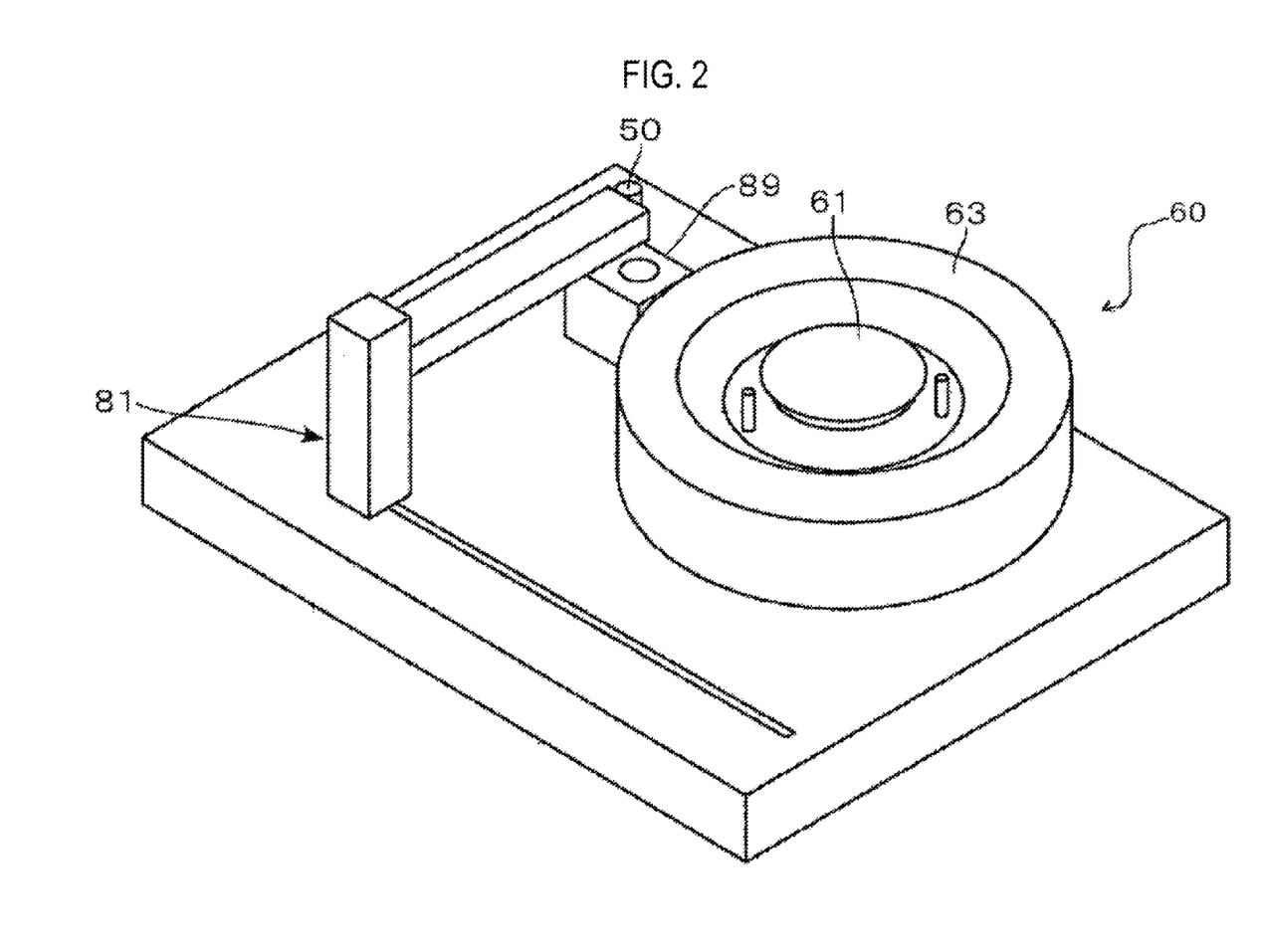
FIG. 2 is a perspective view showing a resist coating apparatus according to one embodiment of the present disclosure.

In FIG. 1, the resist supply unit 10 is viewed from the upstream side of a flow direction of the resist. The resist supply unit 10, which is an example of a processing solution supply unit, includes a closed bottle 11, and stores the resist therein. One end of a pipe 12 and one end of a pipe 32 are connected to an upper portion of the bottle 11. The other end of the pipe 12 is connected to an upper portion of a liquid end tank 13.

The other end of the pipe 32 is connected to a unit, i.e., a $N_2$ gas supply source 31, which supplies an inert gas into the bottle 11. A valve 32a is mounted in the pipe 32. Based on the opening/closing of the valve 32a, an amount of the $N_2$ gas to be supplied into the bottle 11 is changed.

The $N_2$ gas is supplied from the $N_2$ gas supply source 31 into the bottle 11 so that a pressure is applied into the bottle 11, thus feeding the resist therein into the pipe 12. The other end of the pipe 12 is connected to an upper portion of the liquid end tank 13. In the pipe 12, a bubble sensor 33 is mounted in front of the liquid end tank 13.

A degassing pipe 14 configured to exhaust an internal air is mounted in the liquid end tank 13. A valve 14a is mounted in the degassing pipe 14. A pipe 15 through which the resist within the liquid end tank 13 is discharged is connected to a lower portion of the liquid end tank 1. The other end of the pipe 15 is connected to a filter unit 16.

A degassing pipe 17 is mounted to the filter unit 16 in order to discharge impurity or the like filtered by the filter unit 16. A valve 17a is disposed in the degassing pipe 17. The filter unit 16 is connected to a trap 19 through a pipe 18. In the pipe 18, a bubble sensor 34 is mounted in front of the trap 19.

The degassing pipes 14 and 17, and degassing pipes 21 and 27 having the valves 14a and 17a, and valves 21a and 27a mounted therein, respectively, are mounted in each of the liquid end tank 13, the filter unit 16, the trap 19 and a bubble trap 26. One end of a pipe 22 is connected to a lower portion of the trap 19 and the other end thereof is connected to an inlet of a pump unit 23. A valve 22a is mounted in the pipe 22. Examples of the pump unit 23 corresponding to a solution transfer unit may include, e.g., a diaphragm pump. An adjustment device such as a pressure sensor is incorporated in the pump unit 23 so that the resist can be fed at a predetermined pressure. Further, a temperature sensor 35 configured to detect an ambient temperature of the pump unit 23 is mounted in the proximity of the pump unit 23.

An output side of the pump unit 23 is connected to an ultrasonic flowmeter 40 through a pipe 24. The ultrasonic flowmeter 40 has, e.g., a structure in which a cuboid cover covers a tubular body. The detail of the ultrasonic flowmeter 40 will be described later. The other end of the ultrasonic flowmeter 40 is connected to the bubble trap 26 through a pipe 25.

One end of a pipe 28 is connected to a lower portion of the bubble trap 26 and the other portion thereof is connected to an input side of a valve 29. An output side of the valve 29 is connected to the nozzle 50 through a pipe 51.

Figure 3A:
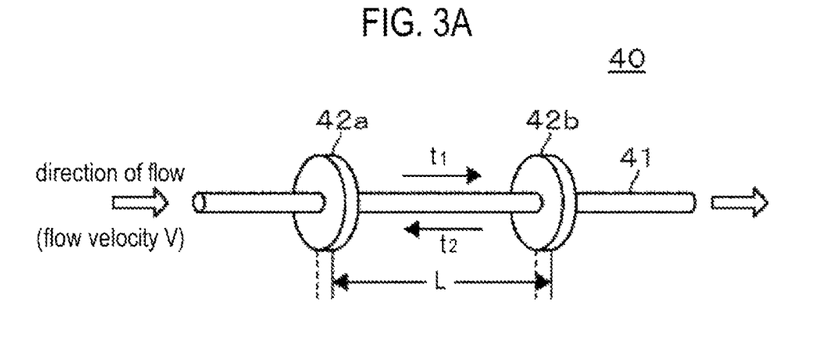
FIGS. 3A and 3B are views showing an internal configuration and an operation of an ultrasonic flowmeter which constitutes the resist coating apparatus according to one embodiment of the present disclosure.

The following is a description of an example of a configuration of the ultrasonic flowmeter 40. FIG. 3A is a view schematically showing the ultrasonic flowmeter 40. The body of the ultrasonic flowmeter 40 includes a resin tube 41 having an outer diameter of, e.g., 4 mm, and an internal diameter of 2 mm or less, which constitutes one portion of a flow path member, and a first piezoelectric element 42a and a second piezoelectric element 42b which circularly surround a periphery of the resin tube 41 and are spaced apart from each other in a flow direction of the solution. The first and second piezoelectric elements 42a and 42b, and the resin tube 41 act as a sensor unit of the ultrasonic flowmeter 40. Examples of the first and second piezoelectric elements 42a and 42b may include, e.g., a lead zirconate titanate (PZT) or the like. The resin tube 41 and the first and second piezoelectric elements 42a and 42b are covered with a plastic cover (not shown). The cover is connected to a detachable coaxial cable and includes end portions projected from front and back sides of the cover. The cover is connected to the pipes in the resist supply unit 10 through the end portions.

Figure 3B:
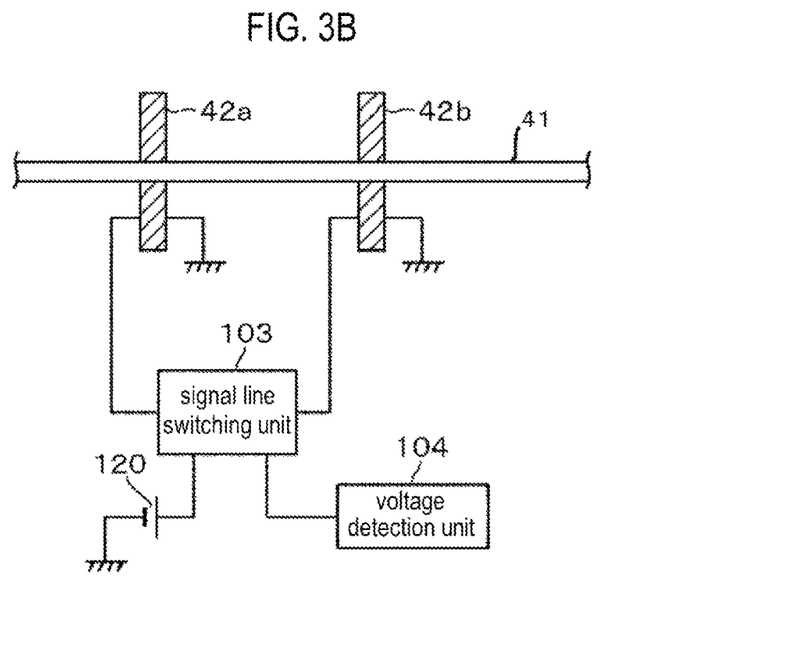

As shown in FIG. 3B, the first piezoelectric element 42a and the second piezoelectric element 42b are connected to a power supply 120 and a voltage detection unit 104 through a signal line switching unit 103. The signal line switching unit 103 selects a first state, where a voltage generated from the power supply 120 is provided to the first piezoelectric element 42a and the voltage detection unit 104 is connected to the second piezoelectric element 42b, and a second state, where the voltage generated from the power supply 120 is provided to the second piezoelectric element 42b and the voltage detection unit 104 is connected to the first piezoelectric element 42a. In one embodiment, a switch member may be provided to implement such a selection operation.

Figure 4:
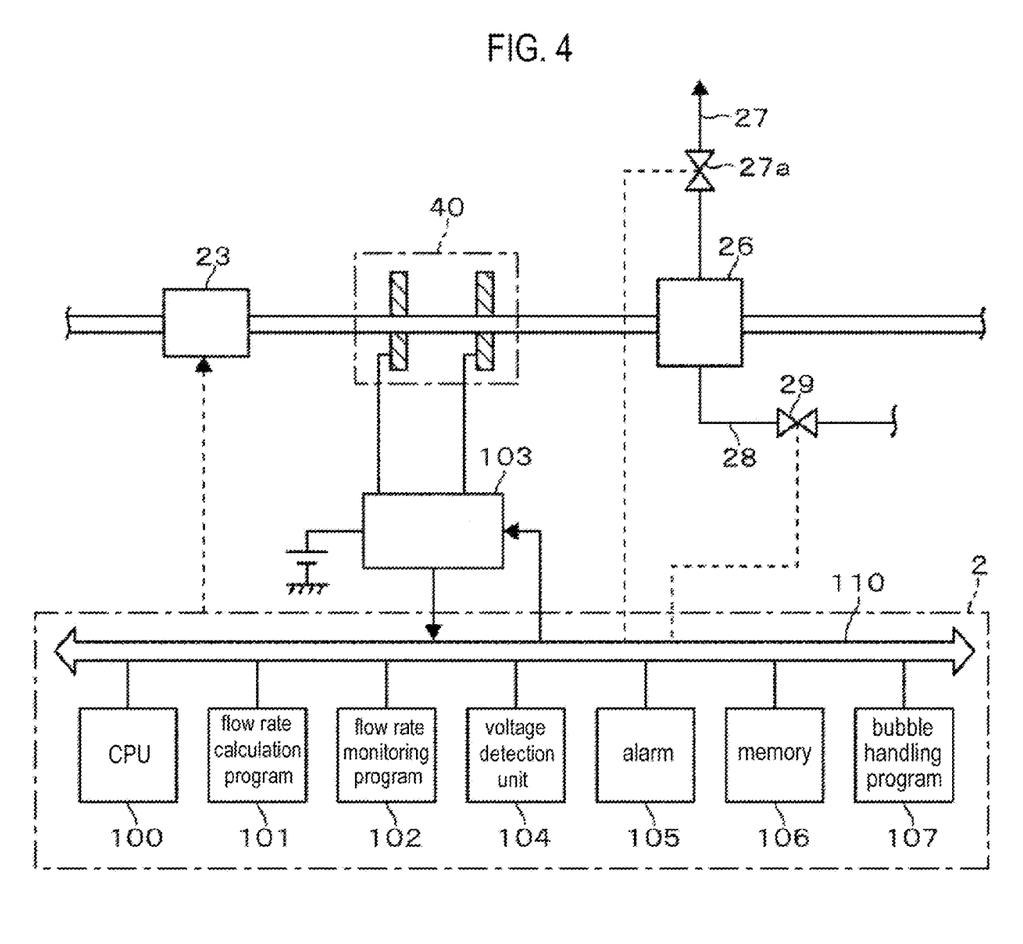
FIG. 4 is a block diagram showing a control unit which controls the entire operation of the resist supply unit.

FIG. 4 shows a control unit 2 including a computer, which is one of components of the resist supply unit 10 according to one embodiment of the present disclosure. In FIG. 4, a numerical number 110 represents a bus, a numerical number 100 represents a CPU (Central Processing Unit). In this embodiment, the voltage detection unit 104 of the ultrasonic flowmeter 40 is shown to be contained in the control unit 2. In the voltage detection unit 104, a program which may instruct an analog/digital converter to convert a voltage generated from the first piezoelectric element 42a (or the second piezoelectric element 42b) into a digital signal is stored. Further, the converted digital value may be read out and/or written in a memory 106. The control unit 2 includes a flow rate calculation program 101 which is a component of the ultrasonic flowmeter 40. An operation principle of the ultrasonic flowmeter 40 including a calculation executed by the flow rate calculation program 101 will be described.

FIG. 3A is a view showing a measuring part of the ultrasonic flowmeter 40. As shown in FIG. 3A, it is assumed that in the resin tube 41, a target fluid to be measured flows from left to right. The application of a voltage to the first piezoelectric element 42a oscillates an ultrasonic having a specific frequency therefrom. The ultrasonic is propagated in the fluid and then is transferred to the second piezoelectric element 42b. The first piezoelectric element 42a and the second piezoelectric element 42b have the same resonance frequency so that the second piezoelectric element 42b, when receiving the ultrasonic oscillated from the first piezoelectric element 42a, outputs a voltage corresponding thereto. Therefore, a period of time from when the voltage is applied to the first piezoelectric element 42a to when the voltage is outputted from the second piezoelectric element 42b can be regarded as a period of time required for the ultrasonic to arrive from the first piezoelectric element 42a at the second piezoelectric element 42b. The period of time is represented as "$t_1$."

Meanwhile, the application of a voltage to the second piezoelectric element 42b oscillates an ultrasonic therefrom. The first piezoelectric element 42a receives the oscillated ultrasonic and generates a voltage corresponding thereto. Therefore, similar to the above, a period of time from when the voltage is applied to the second piezoelectric element 42b to when the voltage is outputted from the first piezoelectric element 42a can be regarded as a period of time required for the ultrasonic to arrive from the second piezoelectric element 42b at the first piezoelectric element 42a. The period of time is represented as "$t_2$."

Assuming that a flow velocity of fluid is V, a velocity of the ultrasonic in the fluid when oscillating is influenced by a viscosity of the fluid, a temperature of the fluid or the like. Such an influence is expressed as an intrinsic constant "C" of the velocity. A distance between the first piezoelectric element 42a and the second piezoelectric element 42b is represented as "L", the following relation is established.

$$t_1 = L/(C+V) \qquad \text{Eq. (1)}$$

$$t_2 = L/(C-V) \qquad \text{Eq. (2)}$$

The velocity "V" of the fluid can be derived as follows by using the above equations Eq. (1) and Eq. (2).

$$V = (L/2) \times (1/t_1 - 1/t_2) \qquad \text{Eq. (3)}$$

By detecting a period of time required for the propagation of the ultrasonic in two ways, the flow velocity V may be derived. Further, an internal cross sectional area of the resin tube 41 in the sensor unit is obvious, and therefore, the flow rate may be obtained.

Further, in the ultrasonic flowmeter 40, the first and second piezoelectric elements 42a and 42b are disposed along the periphery of the resin tube 41 in the circular shape. The distance between the first and second piezoelectric elements 42a and 42b is, e.g., 30 mm which is about thirtieth or fiftieth of a normal distance. The internal diameter of the resin tube 41 is 2 mm or less. Therefore, the ultrasonic flowmeter 40 can measure, e.g., the flow rate of 1 mL/sec or less, which is difficult to be measured by an optical flowmeter. The first and second piezoelectric elements 42a and 42b have been described as being disposed in the circular shape to surround the complete periphery of the resin tube 41, but is not limited thereto. For example, the first and second piezoelectric elements 42a and 42b may be disposed to surround more than half of the complete periphery of the resin tube 41.

The ultrasonic flowmeter 40 can measure a flow velocity in a reverse direction, i.e., a flow velocity in a direction from the wafer W toward the bottle 11 in the resist supply unit 10, and further can measure a significant change in the flow velocity immediately after the valve 29 and the like are opened and closed.

In addition, the ultrasonic flowmeter 40 may be mounted in various locations, e.g., the front of the pump or the front of the nozzle. Also, a plurality of ultrasonic flowmeters 40 may be mounted. Preferably, the ultrasonic flowmeter 40 mounted in front of the nozzle allows good measurement accuracy. It should be mentioned that different system configurations may be applied depending on the location of the mounted ultrasonic flowmeter 40.

While the ultrasonic flowmeter 40 measures the discharged resist amount using the propagation of the ultrasonic, when at least one bubble is contained in the resist, the ultrasonic is reflected from the bubble, which may cause a significant change (noises) in a measured data. Such a significant change is due that an ultrasonic propagation velocity is drastically different between liquid and solid.

Figure 5A:
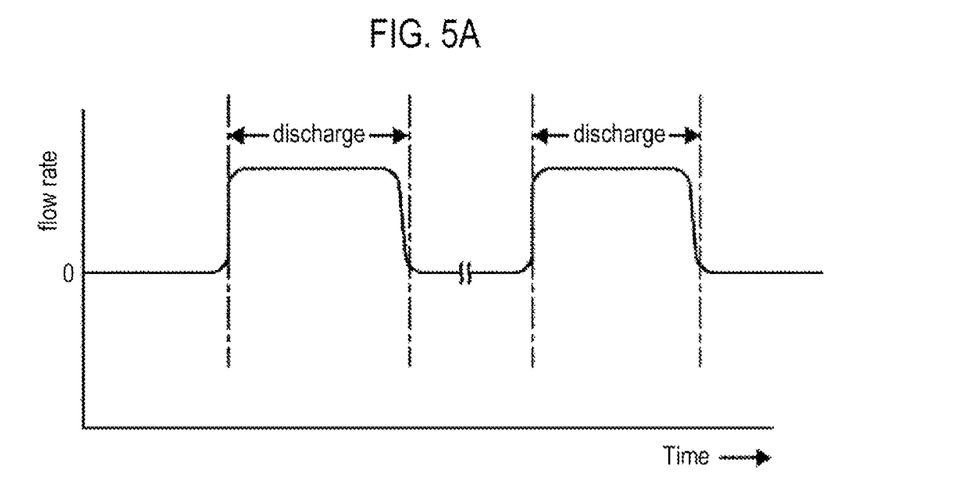
FIGS. 5A and 5B are waveforms of flow rates which are measured at the ultrasonic flowmeter according to one embodiment of the resist supply unit.
Figure 5B:
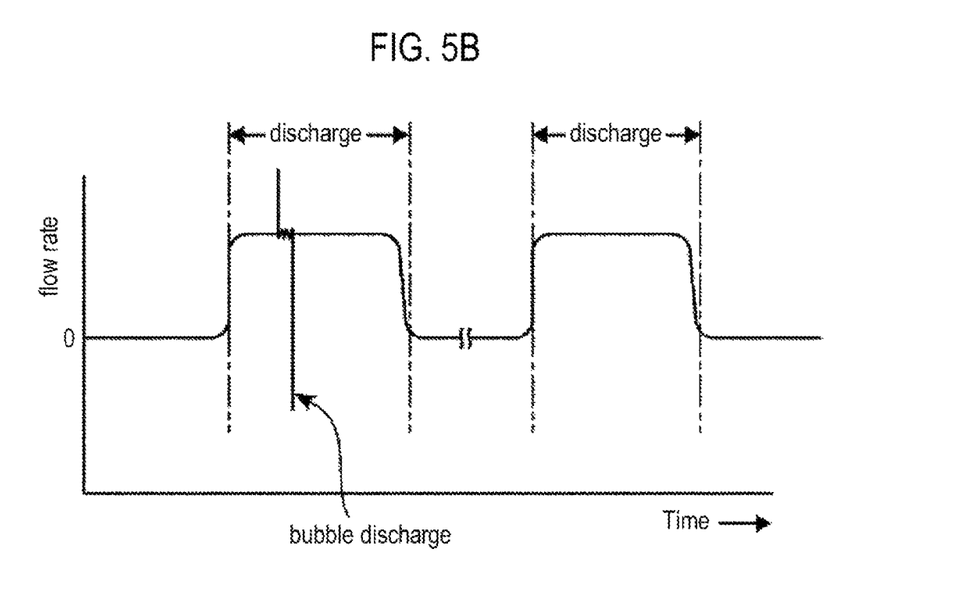

FIGS. 5A and 5B show a time-based transition of flow rates corresponding to on/off operations of a pump, respectively. FIG. 5A shows a case where the bubble does not exist in the resist and FIG. 5B shows a case where the bubble exists in the resist. Specifically, when the bubble is mixed into the resist inside the ultrasonic flowmeter 40 and is detected at a bubble detection unit of the ultrasonic flowmeter 40, the significant change (noises) is manifested on a waveform showing a transition data for the flow rates, as shown in FIG. 5B. Experiments have shown that the bubble having a diameter of 0.3 mm or larger can be detected.

For example, assuming that a bubble is present, the above change (i.e., the presence of the bubble) in flow rates can be detected, when an AND condition is met. The AND condition is met when the flow rate is changed to be increased or decreased, while the change exceeds a threshold, during a predetermined period of time (that is previously set based on a time of noise generation).

The control unit 2 includes a flow rate monitoring program 102 and a bubble handling program 107. The flow rate monitoring program 102 cumulates a flow rate detected by the ultrasonic flowmeter 40 during a period of time when the resist is discharged from the nozzle, i.e., a period of time when the pump is operated, and thus obtain a cumulated discharge amount. Subsequently, the flow rate monitoring program 102 checks whether the cumulated discharge amount falls within a threshold (a set value of total discharge amount) corresponding to the number of times when the resist is discharged from the nozzle. When the cumulated discharge amount falls outside the threshold, the flow rate monitoring program 102 cause an alarm 105 to be triggered.

Figure 7:
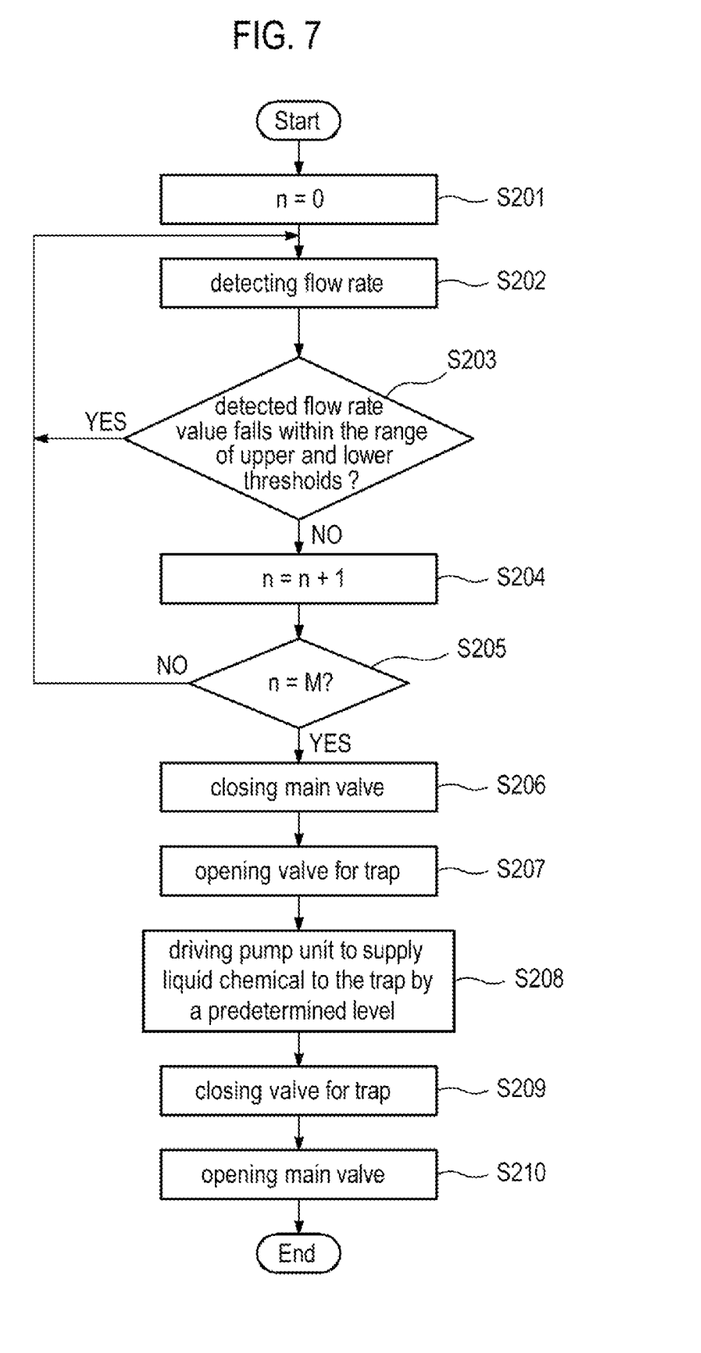
FIG. 7 is a flowchart illustrating a series of operations which are performed from when the ultrasonic flowmeter detects a bubble to when the bubble is discharged to the exterior of a bubble trap.

The bubble handling program 107 is configured to cause gas to be degassed from the bubble trap 26 based on a time-series data of the flow rate value detected by the ultrasonic flowmeter 40. A group of operations is constituted to execute a flow as shown in FIG. 7, which will be described later.

A program including the flow rate monitoring program 102 and the bubble handling program 107 stores instructions (each operation) to perform a predetermined process by executing the operations, which will be described later. This program is stored in a computer-readable recording medium, e.g., a flexible disk, a compact disk, a hard disk, an MO (magneto-optical disk), or the like, and is installed in the CPU 100. Further, the program installed in the CPU 100 includes programs for controlling respective components such as the spin chuck 61, a spin chuck driving unit 62, the nozzle 50, the $N_2$ gas supply source 31, the valve 32a, the bottle 11, the valve 14a, the filter unit 16, the valve 21a, the valve 22a, the pump unit 23, the bubble sensors 33 and 34, the temperature sensor 35, the ultrasonic flowmeter 40, the valve 27a, the valve 29 and the like. The program is installed in a main memory, and then allows each part to be controlled. Therefore, the control for the ultrasonic flowmeter 40 is included in the control for the control unit 2 shown in FIG. 4.

Hereinafter, an operation of the resist supply unit 10 will be described with reference back to FIG. 1. First, the valve 32a is opened to supply the $N_2$ gas from the $N_2$ gas supply source 31 into the bottle 11 through the pipe 32 so as to pressurize the inside of the bottle 11 up to a higher pressure than that in a normal operation. The valves 22a and 29 are opened so that the resist is fed from the bottle 11 to the nozzle 50 through the entire pipe system that is an example of a flow path member. This operation removes air inside the pipes 12, 15, 18, 22, 24, 25, 28, and 51, the liquid end tank 13, the filter unit 16, the trap 19, the pump unit 23, the ultrasonic flowmeter 40, the bubble trap 26, the nozzle 50 and the like by means of the high-pressurized resist.

Upon completion of the aforementioned air removal operation (preliminary work), the wafer W is carried into the resist coating apparatus and the internal pressure of the bottle 11 is maintained at a predetermined pressure in the normal operation. The predetermined pressure is selected as a pressure at which a bubble is not foamed until the resist is supplied to the pump unit 23 (which will be described later), that is, a pressure allowing the resist to have the positive pressure, even if the $N_2$ gas is dissolved in the resist.

The liquid end tank 13 temporally stores the resist and supplies the stored resist to the nozzle 50 when the resist stops to be supplied from the bottle 11. That is, the liquid end tank 13 acts as a buffer tank. Further, when the bubble sensor 33 mounted in front of the liquid end tank 13 detects a bubble, the valve 14a of the degassing pipe 14 is opened such that the bubble are discharged (or degassed) to the external space.

The degassed resist within the liquid end tank 13 flows into the filter unit 16 through the pipe 15 connected to the downstream side from the liquid end tank 13. The filter unit 16 separates foreign substances or residual bubbles within the resist therefrom and discharges the separated foreign substances or the separated residual bubbles externally by opening the valve 17a of the degassing pipe 17. After the foreign substance removal process, the resist flows into the trap 19 through the pipe 18.

When the bubble sensor 34 mounted in front of the trap 19 detects a bubble in the resist in the pipe 18, the valve 21a of the degassing pipe 21 is opened before the resist flows into the pump unit 23, so that the trap 19 removes the detected bubble. Subsequently, the degassed resist flows into the pump unit 23 through the pipe 22. Then, the resist flows from the pump unit 23 into the ultrasonic flowmeter 40 through the pipe 24. The ultrasonic flowmeter 40 measures the flow rate of the resist.

After the flow rate of the resist is measured by the ultrasonic flowmeter 40, the resist flows into the bubble trap 26 through the pipe 25. When the ultrasonic flowmeter 40 detects a bubble, the bubble trap 26 removes the detected bubble by opening the valve 27a of the degassing pipe 27. An example of such a bubble removal operation will be described later. Subsequently, the resist flows into the nozzle 50 from the bubble trap 26 via the pipe 28 and the valve 29. An amount of the resist to be discharged onto the wafer W is adjusted by controlling the valve 29 so that the adjusted amount of resist is discharged onto the wafer W.

A drive amount of the diaphragm pump for discharging the resist is monitored and controlled, based on the cumulated discharge amount which is monitored by the flow rate monitoring program 102. The detailed procedures will be described below.

Figure 6:
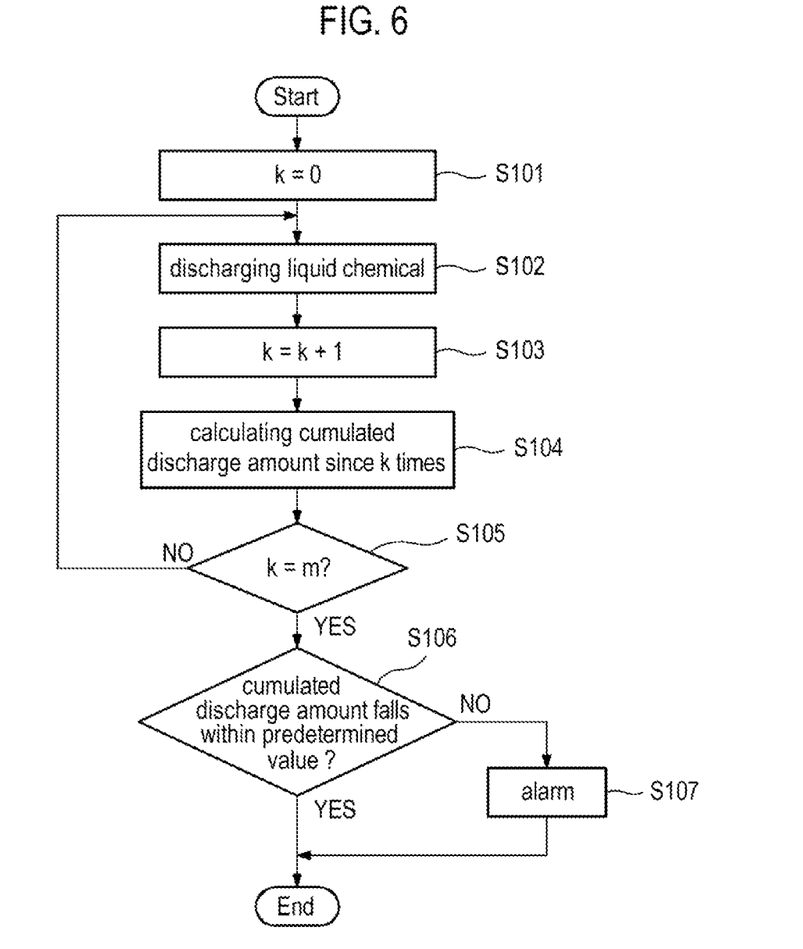
FIG. 6 is a flowchart illustrating a series of operations which are performed by a cumulated value monitoring unit in the resist supply unit.

The following is descriptions of an operation for monitoring the cumulated discharge amount. FIG. 6 is a flowchart illustrating an operation mechanism of the flow rate monitoring program 102 as a cumulated value monitoring unit. Previously, a timing for checking the cumulated discharge amount is determined. That is, a specific number of times at which the discharge operation of the resist from the nozzle has been performed are determined. The specific number of times is represented as "m."

After the resist coating apparatus is launched (or started), a discharge number counter k is reset to zero "0" (operation S101), and a liquid chemical (i.e., the resist) begins to be discharged from the nozzle (operation S102). Then, the discharge number counter k is increased by one (operation S103). Subsequently, a cumulated discharge amount of the resist is calculated since k=0 (operation S104). Then, the discharge number counter k is compared with a value m (operation S105). If the discharge number counter k is less than the value m (operation S105: NO), the process returns to the routine operation (operation S102). If the discharge number counter k is equal to the value m (operation S105: YES), the process goes to operation S106, where it is determined whether the cumulated discharge amount falls within a predetermined value. If the cumulated discharge amount exceeds the predetermined value (i.e., threshold) (operation S106: NO), the process goes to operation S107 where an alarm is triggered to notify an operator of this state. The alarm may allow the operator to perform a maintenance, e.g., in replacing a lot. If the cumulated discharge amount falls within the prescribed value (operation S106: YES), the process ends and subsequently, a routine of FIG. 6 is resumed.

In addition to the execution of the flow rate monitoring program 102, the bubble handling program 107 is executed to perform the following processes.

According to one embodiment, when the bubble was detected, the bubble is trapped by the bubble trap 26 shown in FIG. 1. In this case, the resist is purged within the bubble trap 26, and the bubble is discharged. This embodiment will be described with reference to a flowchart in FIG. 7 which illustrates a series of operations which are performed from when the ultrasonic flowmeter 40 detects a bubble to when the bubble is discharged to the exterior of the bubble trap 26.

Prior to performing a routine of FIG. 7, it is determined the number of times "M" indicating how often the bubble is detected until the bubble is discharged to the exterior of the bubble trap 26.

As the ultrasonic flowmeter 40 is launched (or started), a count value "n" is reset to zero "0" (operation S201) and a flow rate is detected by a flow rate calculation unit (the ultrasonic flowmeter 40) (operation S202). Then, in operation S203, it is determined whether the detected flow rate value falls within a predetermined range. If the flow rate value falls within the predetermined range (operation S203: YES), a normal operation is repeated. The normal operation will be performed as long as the flow rate falls within the predetermined range. If the flow rate falls out of the predetermined range (operation S203: NO), the process goes to operation S204 where the count value n is increased by one. Subsequently, the count value n is compared with the value M (operation S205). If the count value n is less than the valve M in operation S205, the process returns to performing the normal operation of operation S202. If the count value n is equal to the value M in the operation S205, i.e., a number of bubble detection times exceeds the threshold, it is determined as a timing at which the bubble are discharged to the exterior of the bubble trap 26. Thus, the valve 29 is closed (operation S206) and the valve 27a of the degassing pipe 27 is opened (operation S207). Thereafter, the pump unit 23 is driven such that the resist is supplied to the bubble trap 26 up to a predetermined level (operation S208). After the bubble is discharged outside the pipe system in this way, the valve 27a is closed (operation S209) and the valve 29 is opened (operation S210), so that the bubble discharge operation ends. Subsequently, the routine of FIG. 7 is resumed.

Figure 8:
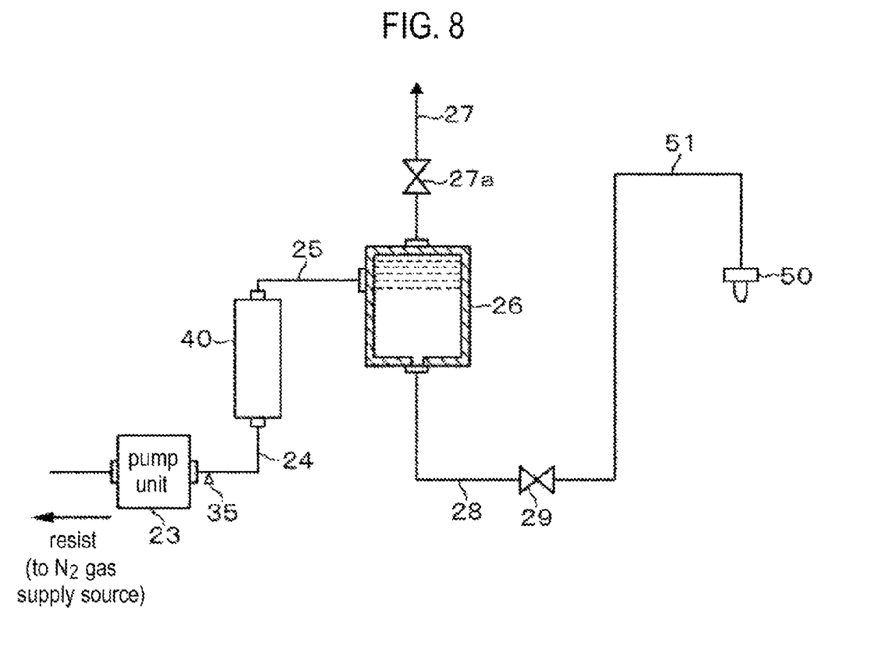
FIG. 8 is a view showing a case where a vertical ultrasonic flowmeter is mounted in the resist supply unit according to another embodiment.

The following is a description of a modified embodiment. In this modified embodiment, the ultrasonic flowmeter 40 may be vertically mounted as shown in FIG. 8, which allows a bubble to pass through an excitation region of the ultrasonic flowmeter 40, while the resist having the bubble is not discharged. As a result, noises can be observed on a measured data as shown in FIG. 5B. This is one of the reasons for vertically mounting the ultrasonic flowmeter 40.

Further, in some embodiments, the resist may be discharged from the nozzle 50 by a dummy dispensing. A specific example is as follows.

Figure 9:
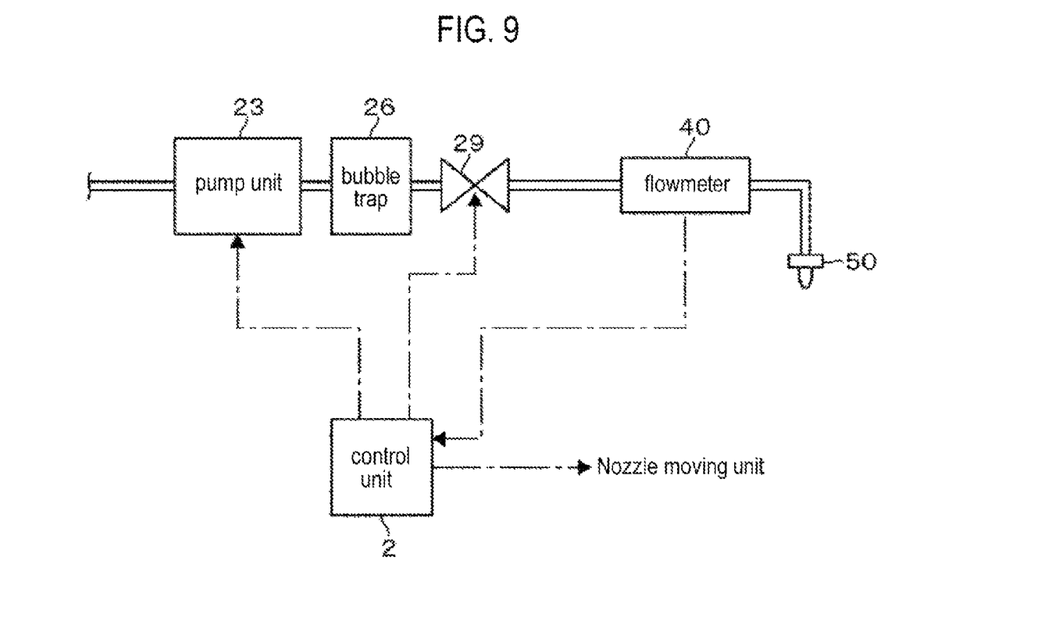
FIG. 9 is a block diagram showing a control mechanism of the ultrasonic flowmeter of the resist coating apparatus according to another embodiment of the present disclosure

First, when a bubble in the resist solution is located in the excitation region of the ultrasonic flowmeter 40, the bubble can be detected based on the flow rate value as described above (see FIGS. 5A and 5B). Upon the detection of the bubble, the control unit 2 performs the normal process until the bubble reaches the nozzle 50. When the bubble reach the nozzle 50, the control unit 2 controls the nozzle 50 to be moved up to the standby bath 89 (see FIG. 2) and drives the pump unit 23 to perform the dummy dispensing. In some embodiment, as shown in FIG. 9, the ultrasonic flowmeter 40 may be mounted in the downstream side from the bubble trap 26 as shown in FIG. 1. FIG. 9 is a view schematically showing a configuration for implementing such an operation. Specifically, because both a volume of the flow path, through which the resist passes from the ultrasonic flowmeter 40 to the nozzle 50, and a flow rate of the resist are well known, it is possible to calculate a period of time required for the bubble to arrive from the ultrasonic flowmeter 40 at the nozzle 50. Thus, similar to the normal case, it is possible to calculate a number of times at which the resist can be discharged before the bubble passes through the nozzle 50. After the normal resist discharge operation is performed two times since, e.g., a moment at which the ultrasonic flowmeter 40 detects the bubble, then the nozzle 50 is moved to the standby bath 89 to perform the dummy dispensing.

Alternatively, instead of the standby of the nozzle 50 and the dummy dispensing, a process which discharges the resist from the nozzle 50 onto the wafer W may be continued and a soft marking may be applied to a wafer W corresponding to a detected bubble such that it makes the operator pay attention to the soft-marked wafer W.

Further, in some embodiments, in the resist supply unit 10, if a total discharge amount until the resist is discharged from the nozzle 50 at a plurality of number of times falls outside the threshold corresponding to the number of discharge times of the resist from the nozzle 50, instead of triggering the alarm 105 as described above, a flow rate of the resist may be increased if the flow rate of the resist is being decreased by that time, and a flow rate of the resist may be decreased if the flow rate of the resist is being increased by that time.

Further, in some embodiments, the soft marking may be applied to an interest wafer, a discharge pressure of the pump may be controlled, or subsequent processes may be stopped, which makes it possible to detect a product failure.

Controlling the discharge pressure of the pump may include the following method. For example, the threshold corresponding to the aforementioned number of discharge times includes an upper threshold and a lower threshold of a corresponding flow rate. When the total discharge amount is lower than the lower threshold, the discharge pressure of the pump is increased. In this case, the discharge pressure of the pump, which is to be increased when the total discharge amount is lower than the lower threshold, may be previously determined. For example, when the total of discharge amount is lower than 0.01 mL, the discharge pressure of the pump is increased by 0.1 kPa. This controlling, although depending on the variety, may be performed in a real time, or by segmenting a period of time (e.g., each one times of resist discharge).

As an application of a function which calculates the discharge amount, there is a function which compiles a record of continuously-measured flow rate values in a database and feedbacks the data, thus compensating the resist discharge amount. A specific example of the function may include controlling a discharge system based on a variation in waveform of flow rate values which are measured by monitoring a flow rate. Further, an example of the function may include controlling the flow rate value by feedback-controlling the pump unit 23 based on the variation in the flow rate value, applying a compensation to a liquid suction operation of the pump unit 23, compensating opening/closing operations of the valve 29, or the like.

Further, in some embodiments, records of the measured flow rate value, a temperature of the resist at that measure point and a temperature at the periphery of the pump unit 23 may be compiled in a database. These record data is fed back to compensate a pressure value of the pump unit 23.

Specifically, since a viscosity of the resist depends on a temperature, when coating the resist onto the wafer W, a degree of the resist diffusion varies according to the temperature when a spin coating is performed. Therefore, it is required to change the discharge amount responsive to the temperature of the resist. To do this, an intended resist discharge amount is previously determined corresponding to the temperature of the resist. It is also inspected about how to set the pressure value of the pump unit 23 for the temperature of the periphery of the pump unit 23 which is measured at the temperature sensor 35 in order to discharge the intended resist discharge amount from the nozzle 50. A correlation of the measured temperature and the set pressure value is recorded and these results are compiled in a database. In an actual operation, the pressure value of the pump unit 23 is compensated based on the database, the temperature of the resist which is measured by the ultrasonic flowmeter 40 while the resist is not discharged, and the temperature of the periphery of the pump unit 23 which is obtained by the temperature sensor 35. Then, the resist starts to be discharged. In some embodiments, during the discharge of the resist, an operation may be performed which measures the flow rate of the resist using the ultrasonic flowmeter 40 and checks whether the intended resist amount is discharged. At this time, in a case where the flow rate is compensated by an external solution temperature monitor, it is required that the solution temperature is adjusted to a set temperature. Under such a condition, a correlation of the external temperature and the flow rate is defined.

As described above, the resist supply unit 10 is capable of controlling the discharge of the resist while minimizing an external influence, based on data obtained by the flow rate measurement of the ultrasonic flowmeter 40.

Although in the above embodiment, the resist supply unit 10 has been described as one example of the solution processing apparatus according to the present disclosure, but the solution is not limited to the resist. In another solution processing apparatus, a processing solution or thinner used in forming a protective film, an anti-reflection film or the like (e.g., a pre-wet solution, a peeling solution) may be used as the processing solution.

In some embodiments, a method which generates an alarm to urge the operator to take precautions upon the detection of the bubble may be employed. The alarm may be generated for each bubble. Alternatively, the alarm may be generated when a predetermined number of bubbles are detected. Further, the ultrasonic flowmeter 40 may be used in detecting a micro bubble.

Further, the waveform of the flow rate measured at the ultrasonic flowmeter 40 shows different characteristics according to a velocity of fluid. Accordingly, by measuring the waveform, it is possible to prevent an improper connection of a processing solution bottle in a liquid chemical supply source.

Further, an ultrasonic propagation velocity of the ultrasonic flowmeter 40 depends on a variation in resist temperature. Thus, the ultrasonic flowmeter 40 can be used in detecting the variation in resist temperature when the resist stops to be supplied, using a database previously compiled the relationship between the ultrasonic propagation velocity and the temperature of the resist.

According to the present disclosure in some embodiments, an ultrasonic flowmeter is provided with a first piezoelectric element and a second piezoelectric element which are spaced apart from each other in a flow direction of a processing solution and are formed in a circular shape to surround a periphery of a flow path member, which detects a flow rate of the processing solution based on a ultrasonic propagation time between the first and second piezoelectric elements. Therefore, it is possible to detect a minute flow rate of 1 mL/sec or less with a high accuracy. This allows an amount of the processing solution which is to be discharged from a nozzle onto a substrate to meet a set amount with a high accuracy while keeping a minute amount.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. An apparatus configured to perform a solution process by supplying a processing solution from a processing solution supply source to the substrate held on a substrate holder via a flow path member and a nozzle, the apparatus comprising:
    a solution transfer unit configured to transfer the processing solution to the nozzle, and mounted to the flow path member;
    an ultrasonic flowmeter mounted to the flow path member at a downstream side from the solution transfer unit;
    a bubble detection unit configured to detect a bubble in the processing solution based on a variation of flow rates measured by the ultrasonic flowmeter;
    a bubble trap mounted to the flow path member at a downstream side from the ultrasonic flowmeter;
    a valve mounted to the flow path member at a downstream side from the bubble trap; and
    a control unit configured to control the bubble to be discharged by closing the valve and supplying the processing solution to the bubble trap if a number of times when the ultrasonic flowmeter detects the bubble exceeds a threshold,
    wherein a lower limit of a flow rate range which is measured by the ultrasonic flowmeter is equal to or less than 1 mL/sec, and
    wherein the ultrasonic flowmeter includes:
    a first piezoelectric element and a second piezoelectric element, which are spaced apart from each other in a flow direction of the processing solution, and are formed in a circular shape to surround a periphery of the flow path member; and
    a measuring unit configured to measure the flow rate of the processing solution, based on a variation of ultrasonic propagation times between when ultrasonic is propagated from the first piezoelectric element to the second piezoelectric element and when the ultrasonic is propagated from the second piezoelectric element to the first piezoelectric element.

2. The apparatus of claim 1, wherein the flow path member between the first piezoelectric element and the second piezoelectric element is formed in a cylindrical shape having an inner diameter of 2 mm or less.

3. The apparatus of claim 1, further comprising a cumulated value monitoring unit configured to obtain a cumulated discharge value by cumulating the flow rates detected by the ultrasonic flowmeter during a cumulated time until the processing solution is discharged from the nozzle, and to output an alarm if the cumulated discharge value exceeds a threshold corresponding to the number of times when the processing solution has been discharged from the nozzle.

4. The apparatus of claim 1, wherein the processing solution is supplied from the processing solution supply source to the substrate at a flow rate equal to or less than 1 mL/sec.

5. A method for performing a solution process by supplying a processing solution from a processing solution supply source to the substrate held on a substrate holder via a flow path member and a nozzle, the method comprising:
    measuring a flow rate of the processing solution by an ultrasonic flowmeter mounted to the flow path member;
    detecting a bubble based on a variation in the flow rate; and
    controlling the bubble to be discharged by closing the valve and supplying the processing solution to the bubble trap using a bubble trap and a valve when the number of times when the ultrasonic flowmeter detects the bubble exceeds a threshold,
    wherein a lower limit of the flow rate which is measured by the ultrasonic flowmeter is equal to or less than 1 mL/sec,
    wherein the flow rate of the processing solution is measured using a first piezoelectric element and a second piezoelectric element which are spaced apart from each other in a flow direction of the processing solution and are formed in a circular shape to surround a periphery of the flow path member, based on a variation of ultrasonic propagation times between when ultrasonic is propagated from the first piezoelectric element to the second piezoelectric element and when the ultrasonic is propagated from the second piezoelectric element to the first piezoelectric element, and wherein the bubble trap is mounted to the flow path member at a downstream side from the ultrasonic flowmeter, and the valve is mounted to the flow path member at a downstream side from the bubble trap.

6. The method of claim 5, further comprising:
obtaining a cumulated discharge value by cumulating the flow rates detected by the ultrasonic flowmeter during a cumulated time until the processing solution is discharged from the nozzle, and
outputting an alarm if the cumulated discharge value exceeds a threshold corresponding to the number of times when the processing solution has been discharged from the nozzle.

7. The method of claim 5, wherein the processing solution is supplied from the processing solution supply source to the substrate at a flow rate equal to or less than 1 mL/sec.

8. A non-transitory computer-readable recording medium storing a program that causes a computer to execute a method for performing a solution process by supplying a processing solution from a processing solution supply source to the substrate held on a substrate holder via a flow path member and a nozzle, the method comprising:
measuring a flow rate of the processing solution by an ultrasonic flowmeter mounted to the flow path member;
detecting a bubble based on a variation in the flow rate; and
controlling the bubble to be discharged by closing the valve and supplying the processing solution to the bubble trap using a bubble trap and a valve when the number of times when the ultrasonic flowmeter detects the bubble exceeds a threshold,
wherein a lower limit of the flow rate which is measured by the ultrasonic flowmeter is equal to or less than 1 mL/sec,
wherein the flow rate of the processing solution is measured using a first piezoelectric element and a second piezoelectric element which are spaced apart from each other in a flow direction of the processing solution and are formed in a circular shape to surround a periphery of the flow path member, based on a variation of ultrasonic propagation times between when ultrasonic is propagated from the first piezoelectric element to the second piezoelectric element and when the ultrasonic is propagated from the second piezoelectric element to the first piezoelectric element, and
wherein the bubble trap is mounted to the flow path member at a downstream side from the ultrasonic flowmeter, and the valve is mounted to the flow path member at a downstream side from the bubble trap.

9. An apparatus configured to perform a solution process by supplying a processing solution from a processing solution supply source to the substrate held on a substrate holder via a flow path member and a nozzle, the apparatus comprising:
a solution transfer unit configured to transfer the processing solution to the nozzle, and mounted to the flow path member;
an ultrasonic flowmeter mounted to the flow path member at a downstream side from the solution transfer unit;
a bubble detection unit configured to detect a bubble in the processing solution based on a variation of flow rates measured by the ultrasonic flowmeter;
a solution receiving unit configured to receive the processing solution which is discharged from the nozzle by a dummy dispensing; and
a control unit configured to perform the solution processing by discharging the processing solution from the nozzle to the substrate a predetermined number of times, and to perform the dummy dispensing in the solution receiving unit, when the ultrasonic flowmeter detects the bubble,
wherein a lower limit of a flow rate range which is measured by the ultrasonic flowmeter is equal to or less than 1 mL/sec, and
wherein the ultrasonic flowmeter includes:
a first piezoelectric element and a second piezoelectric element, which are spaced apart from each other in a flow direction of the processing solution, and are formed in a circular shape to surround a periphery of the flow path member; and
a measuring unit configured to measure the flow rate of the processing solution, based on a variation of ultrasonic propagation times between when ultrasonic is propagated from the first piezoelectric element to the second piezoelectric element and when the ultrasonic is propagated from the second piezoelectric element to the first piezoelectric element.

10. The apparatus of claim 9, wherein the flow path member between the first piezoelectric element and the second piezoelectric element is formed in a cylindrical shape having an inner diameter of 2 mm or less.

11. The apparatus of claim 9, further comprising a cumulated value monitoring unit configured to obtain a cumulated discharge value by cumulating the flow rates detected by the ultrasonic flowmeter during a cumulated time until the processing solution is discharged from the nozzle, and to output an alarm if the cumulated discharge value exceeds a threshold corresponding to the number of times when the processing solution has been discharged from the nozzle.

12. The apparatus of claim 9, wherein the processing solution is supplied from the processing solution supply source to the substrate at a flow rate equal to or less than 1 mL/sec.

13. A method for performing a solution process by supplying a processing solution from a processing solution supply source to the substrate held on a substrate holder via a flow path member and a nozzle, the method comprising:
measuring a flow rate of the processing solution by an ultrasonic flowmeter mounted to the flow path member;
detecting a bubble based on a variation in the flow rate; and
controlling to perform a solution process by discharging the processing solution from the nozzle to the substrate a predetermined number of times, and to perform a dummy dispensing in a solution receiving unit, when the ultrasonic flowmeter detects the bubble,
wherein a lower limit of the flow rate which is measured by the ultrasonic flowmeter is equal to or less than 1 mL/sec, and
wherein the flow rate of the processing solution is measured using a first piezoelectric element and a second piezoelectric element which are spaced apart from each other in a flow direction of the processing solution and are formed in a circular shape to surround a periphery of the flow path member, based on a variation of ultrasonic propagation times between when ultrasonic is propagated from the first piezoelectric element to the second piezoelectric element and when the ultrasonic is propagated from the second piezoelectric element to the first piezoelectric element.

14. The method of claim 13, further comprising:

obtaining a cumulated discharge value by cumulating the flow rates detected by the ultrasonic flowmeter during a cumulated time until the processing solution is discharged from the nozzle, and outputting an alarm if the cumulated discharge value exceeds a threshold corresponding to the number of times when the processing solution has been discharged from the nozzle.

15. The method of claim 13, wherein the processing solution is supplied from the processing solution supply source to the substrate at a flow rate equal to or less than 1 mL/sec.

* * * * *